United States Patent [19]

Shaw

[11] 4,333,765
[45] Jun. 8, 1982

[54] SANDLESS CONCRETE

[76] Inventor: Arthur Shaw, 101 Stock Isle Apartments, Key West, Fla. 33040

[21] Appl. No.: 176,515

[22] Filed: Aug. 8, 1980

[51] Int. Cl.$^3$ ............................................... C04B 7/02
[52] U.S. Cl. ..................................................... 106/98
[58] Field of Search ......................................... 106/98

[56] References Cited

U.S. PATENT DOCUMENTS

| | | | |
|---|---|---|---|
| 3,202,522 | 8/1965 | Yang et al. | 106/98 |
| 3,232,777 | 2/1966 | Bush | 106/98 |
| 3,948,672 | 4/1976 | Harnsberger | 106/98 |
| 4,058,405 | 11/1977 | Snyder et al. | 106/98 |
| 4,105,459 | 8/1978 | Mehta | 106/98 |

Primary Examiner—Mark Bell
Attorney, Agent, or Firm—Weingarten, Schurgin & Gagnebin

[57] ABSTRACT

A cementitious material is formed without the necessity of sand or fresh water by sizing coarse aggregate with silicon dioxide in salt water and mixing the sized aggregate with cement. Fresh water is not required, and the conventional fine aggregate component (typically sand) can be omitted. This material can be formed using a minimal amount of water resulting in a high-strength, light weight, cementitious material comprising a plurality of sized aggregate elements positioned contiguous to one another at a plurality of points and defining spaces in between. The aggregate elements are bonded together at the points of contiguity into a rigid coherent body.

4 Claims, 1 Drawing Figure

SANDLESS CONCRETE

FIELD OF THE INVENTION

This invention relates to an improved cementitious material which can be made without the necessity of sand or fresh water.

BACKGROUND OF THE INVENTION

Concrete is a mixture of aggregates firmly bound into a monolithic mass by a cementing agent. Typically, it is a mixture of a coarse aggregate such as small stones, a fine aggregate such as sand, and a cementing agent such as Portland cement. Concrete is typically formed by mixing the components in fresh water and then permitting the mixture to cure. In this process the voids between the particles of coarse aggregate are filled by the fine aggregate, and the whole is cemented together into a generally impermeable mass by the binding action of the cement. The strength of the cementing agent is a function of the water/cement ratio.

Both sand and fresh water have been historically regarded as necessary ingredients in concrete. Both ingredients are typically specified as substantially salt-free to avoid salt deterioration.

Conventional concrete, however, is wasteful of resources. The cost of suitable sand is no longer negligible, and it is expensive and energy consuming to truck and mix. Similarly, the supply of fresh water is no longer limitless; and, in many parts of the world water is a scarce resource. Conventional concrete, using large quantities of both sand and water, is needlessly expensive and heavy for many applications. Accordingly, there is a need for a cementitious material which can be made without the necessity of sand and fresh water.

SUMMARY OF THE INVENTION

In accordance with the invention, a cementitious material is formed without the necessity of sand or fresh water of sizing coarse aggregate with silicone dioxide in salt water and mixing the sized aggregate with cement. Fresh water is not required, and the conventional fine aggregate (typically sand) can be omitted. The material can be formed using a minimal amount of water resulting in a high-strength, light weight, cementitious material comprising a plurality of sized aggregate elements positioned contiguous to one another at a plurality of points and defining spaces in between. The aggregate elements are bonded together at the points of contiguity into a rigid coherent body.

BRIEF DESCRIPTION OF THE DRAWING

The nature, advantages and various additional features of the invention will appear more fully upon consideration of the illustrative embodiments now to be described in detail in connection with the accompanying drawing (FIG. 1) which is an enlarged schematic cross section of a typical cementitious material in accordance with the invention.

DETAILED DESCRIPTION OF THE DRAWING

Figure 1:
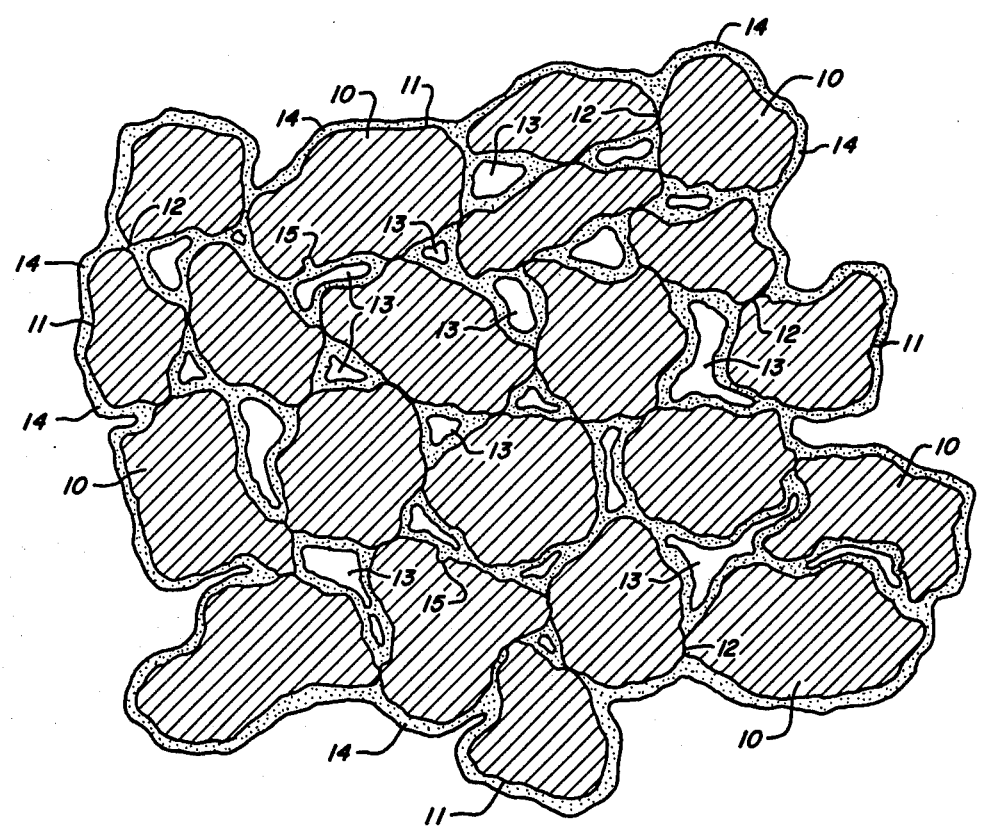

Referring to the drawing, FIG. 1 is a schematic cross section of a typical cementitious material in accordance with the invention comprising plural elements 10 of a coarse aggregate sized by a thin layer of silicon dioxide 11. The sized aggregate elements are positioned contiguous to one another at a plurality of points 12, and they define spaces or voids 13 between contiguous elements. The contiguous elements are bonded together into a rigid, coherent body by cement 14 concentrated primarily at the points of contiguity. Highly irregular areas of the aggregate, such as cavity 15, are predominantly filled with sizing material 11.

A preferred method for making such a concrete involves the steps of forming an aqueous suspension of finely divided silicon dioxide, sizing an aggregate in the suspension, adding cement, and pouring, casting and curing the resulting mixture. Specifically, an aqueous suspension of finely divided silicon dioxide is formed by adding the silicon dioxide to water in a cement mixer and mixing until the silicon dioxide particles are uniformly suspended. The water can be either fresh water or salt water, such as sea water. An aggregate is then added to the suspension and mixed therein until the elements of the aggregate are sized with a coating of silicon dioxide. Cement is added to the mixer, and the mixing is continued until the sized elements of aggregate are thoroughly coated with cement. The resulting mixture is then poured, cast and cured.

The term saltwater, as used herein, is distinguished from fresh water by the presence of greater than about 100 parts per million (by weight) of soluble chlorides such as KCl, NaCl and $CaCl_2$.

In the preferred practice of the invention the aggregate elements have a size in the range between 0.05 and 3.0 inches. The silicon dioxide is preferably 100 mesh or finer. Each cubic yard of such aggregate is sized with 5 to 35 pounds of silicon dioxide in 10 to 25 gallons of water. The sized aggregate is then mixed with between 150 and 350 pounds of cement.

In a preferred composition, for each cubic yard of ⅛ inch to ¼ inch aggregate, 10 pounds of 300 mesh silicon dioxide is suspended in 12 gallons of sea water, and about 240 pounds of Portland cement is mixed with the aggregate after sizing.

The finely divided silicon dioxide aids in uniformly dispersing the water throughout the aggregate. This uniform dispersal results in a particularly efficient use of cement and water. The sizing minimizes the amount of cement by concentrating the cement onto the points of contact and filling in cavities in the aggregate. It also raises the cement/water ratio to values greater than that of conventional concretes, making the cement bonding particularly effective.

It should be understood that in practicing the invention, the cement utilized can be anyone of the many types of conventional cement used in making concrete, including the several types of Portland cement, Portland white cement, high alumina cement and natural cement. And while the term "coarse" has been used to describe the aggregate, this term is used primarily to denote the non-necessity of a relatively finer second aggregate. With increasingly finer silicon dioxide, one could use an increasingly finer "coarse" aggregate down to the level of sand.

It should also be understood that in practicing the invention, typical conventional additives such as flu ash, aluminates, accelerants, retardants and reinforcing materials can be added without changing the essential nature of the invention.

The advantages of this cementitious material are many-fold. First, as described above, it is economical in its efficient use of cement. Second, it eliminates the necessity for a relatively finer aggregate (typically sand) to fill the voids. Third, it minimizes the amount of water required, thereby increasing the strength of the cementitious bonding and effecting rapid curing. This more rapid curing permits the concrete of the invention to be laid at temperatures colder than those at which conventional concretes can be laid. Fourth, it permits sea water to be substituted for fresh water, offering particular advantages for use of this material in construction at coastal or arid locations.

If coarse, relatively uniform aggregate is used, the resulting product is highly water permeable. The permeable form of the invention is particularly useful in constructing large area structures such as roadways and parking lots with minimal interference with the natural flood plains. It exhibits a high degree of resistance to damage from alkali and salt, and it exhibits a much lower tendency to "slump" after pouring than does conventional concrete.

While the invention has been described in connection with but a small number of specific embodiments, it is to be understood that these are merely illustrative of the many other specific embodiments which can also utilize the principles of the invention. Thus, numerous and varied compositions can be made by those skilled in the art without departing from the spirit and scope of the present invention.

What is claimed is:

1. A method of making sandless cementitious material comprising the steps of:
   forming an aqueous suspension of silicon dioxide of 100 mesh or finer;
   sizing an aggregate in said aqueous suspension, said aggregate being predominantly comprised of aggregate elements having a size in the range between 0.05 and 3 inches, each cubic yard of said aggregate being sized with 10 to 35 pounds of silicon dioxide in 10 to 25 gallons of water;
   adding between 150 and 600 pounds of cement to each cubic yard of said sized aggregate in said suspension; and
   permitting the mixture of water, sized aggregate and cement to cure.

2. The method according to claim 1 wherein said aqueous suspension is formed in salt water.

3. The method according to claim 1 wherein said aqueous is formed in sea water.

4. The sandless cementitious material made by the processes of claim 1, 2 or 3.

* * * * *